US005366431A

United States Patent [19]

Smith et al.

[11] Patent Number: 5,366,431

[45] Date of Patent: Nov. 22, 1994

[54] AUTOMATED PRESS BRAKE DIE TRANSFER SYSTEM

[75] Inventors: Dana C. Smith, Benton; Russell C. Cantrell, Wichita, both of Kans.

[73] Assignee: Uniflo Conveyor, Inc., Wichita, Kans.

[21] Appl. No.: 626,990

[22] Filed: Dec. 13, 1990

[51] Int. Cl.$^{5}$ .............................................. B23Q 3/155

[52] U.S. Cl. .......................................... 483/1; 72/446; 483/29

[58] Field of Search .................. 29/568; 483/1, 28, 29; 72/446, 448; 83/698; 414/495; 211/1.54

[56] References Cited

U.S. PATENT DOCUMENTS

| | | | |
|---|---|---|---|
| Re. 25,670 | 10/1964 | Hansen et al. | 29/568 X |
| 3,516,277 | 6/1970 | Bracco et al. | 72/446 |
| 3,674,155 | 7/1972 | Kessler | 211/1.54 |

FOREIGN PATENT DOCUMENTS

| | | | |
|---|---|---|---|
| 6061125 | 4/1985 | Japan | 72/448 |
| 0130428 | 7/1985 | Japan | 72/448 |

*Primary Examiner*—Z. R. Bilinsky
*Attorney, Agent, or Firm*—Litman, McMahon & Brown

[57] ABSTRACT

An automated die transfer system for location adjacent to one end of a press brake bed. It includes an upper and lower tier storage rack for storing a die, or for transferring a die to a press brake bed. The racks may have different widths, and rollers spaced along their length. A wheeled carriage on rails carries the storage rack. A first drive motor moves the carriage horizontally along the tracks, while a second drive motor is linked to a drive for raising and lowering the storage rack. A control system, which includes a multi-axis axis control, is connected to both motors. The control panel is mounted on a hinged support arm. In use, the control panel is pivoted to the front of the press brake, turned on, and the multi-axis control is used to control the first drive motor to move the carriage into alignment with one end of a press brake bed, and is then used to control the second drive motor to cause the storage rack to move vertically adjacent to the end of the press brake bed. Dies can then be transferred from the press brake bed onto the storage rack, or vice versa. After the transfer activity is completed the carriage is moved away from the work area, and the support arm rotated to pivot the control panel out of the way. The rails may be adjacent to, and service, two or more press brake beds.

21 Claims, 5 Drawing Sheets

AUTOMATED PRESS BRAKE DIE TRANSFER SYSTEM

BACKGROUND OF THE INVENTION (a) Field of the Invention

This invention relates to a system for changing metal bending dies and more particularly, but not by way of limitation to an automated die transfer system for changing both male and female dies used in the bed of a press brake.

(b) Description of the Prior Art

Heretofore there have been a variety of stationary racks and wheeled carts for receiving and storing male and female press brake dies. These prior art devices provided a manual system for storing dies and receiving and transferring dies. For example, one large machine tool manufacturer offers in their press brake accessory line a die staging table designed as a push cart having grooved wheels and riding on a track for minimal operator effort. But, these manual systems do not provide for automated horizontal and automated vertical placement of the dies adjacent one end of the bed of the press brake. Also, because there is no combination of horizontal and vertical alignment of the table or cart, heavy dies often require two or more men to lift the dies onto the storage device while using a fork lift, chain hoist, and other types of heavy lifting equipment. In addition, prior art devices have not provided for a roller system capable of suspending heavy dies with low friction rollers enabling easy transport of dies on and off of the die table.

In U.S. Pat. No. 3,831,427 to Lee; U.S. Pat. No. 4,866,974 to Shiraishi et al; U.S. Pat. No. 4,680,955 to Sakamoto; and U.S. Pat. No. 4,698,894 to Lingaraju et al different types of die exchange and retention devices along with feed tables are described. None of these patents disclose a system which can service one or more press brakes for quickly and safely transferring male and female press brake dies by a single press brake operator, The subject invention eliminates the need of manhandling heavy die sets during a die change out of the press brake.

SUMMARY OF THE INVENTION

An object of the invention is to provide an automated die transfer system which allows a single operator to change out heavy male and female press brake dies mounted along a length of a press brake bed without the use of additional manpower or equipment, such as a fork lift, a chain hoist, and other heavy lifting equipment and their operators.

Yet another object of the invention is to provide a combined upper and lower tier storage rack for receiving and storing male and female die pairs at the same location, or for transferring a male and female die pair to a press brake bed.

Another object of the invention is to provide racks having different widths for receiving and storing male and female dies of different widths and shapes so that the die rack storage assembly can accommodate both standard and custom dies.

Still a further object of the invention is to provide a die rack storage assembly in which dies which are used more often may be located within the die rack storage assembly at locations which require the least amount of movement of the system, thereby also reducing transfer and travel time.

Another object of the invention is to provide racks having rollers spaced along their length in order to ease the movement of dies into the racks and the transfer of dies therefrom.

Still a further object of the invention is to provide a wheeled carriage which carries such a storage rack.

Still another object of the invention is to provide a pair of floor mounted tracks or parallel rails which are positioned on the floor adjacent to and perpendicular to one end of the length of a press brake bed, upon which rails the carriage wheels can ride.

Another object of the invention is to provide such floor mounted tracks which pivot at a hinge point so that a portion of the tracks disposed in front of the press brake can be folded out of the way to eliminate any obstruction of the system in front of the press brake when the transfer system is not in use.

A still further object of the present invention is the provision of a first drive motor which moves the carriage and the storage rack which it carries in a horizontal direction along such tracks, and a second drive motor for raising and lowering the storage rack vertically, so that the storage rack can be accurately located adjacent one end of the length of a press brake bed in order to receive and store a male die and a female die from a press brake bed, or for transferring a male die and a female die pair from the storage rack to a press brake bed.

Another object of the present invention is the provision of a control system which is connected to both the first and second drive motors, and which serves to control the movement of the carriage and the storage rack which it carries.

Yet another object of the present invention is the inclusion in the control system of a multi-axis control, such as a joystick, which can be used to control both the first drive motor and thereby the horizontal motion of the carriage along the rails, and also the second drive motor and thereby the vertical raising and lowering of the storage rack.

A still further object of the present invention is to mount the control panel on a hinged support arm which is attached to the end of the press brake which is adjacent to the automated die transfer system of the present invention, so that the control panel can be pivoted away from the end of the press brake when it is being used to control the position of the carriage and storage rack, and then back to the rear of the press brake and out of the way when it is no longer being used.

Another object of the invention is to provide such a system for quickly changing die sets with little or no damage to the dies during their wear life.

Yet another object of the invention is to save time and make press brake operations more efficient, thereby reducing inventory requirements for formed parts.

Another object of the invention is to provide such a system which can service not only one press brake but a plurality of press brakes by spacing the system adjacent to or between press brakes so that the rails of the system allow for the positioning of the storage assembly and carriage adjacent one end of each of the press brake beds.

The present invention relates to an automated die transfer system for changing a male and female die pair mounted along a length of a press brake bed used in a press brake. The system includes an upper and lower tier storage rack for receiving and storing a male and female die pair or for transferring a male and female die pair to a press brake bed. In preferred embodiments the racks have different widths for receiving and storing male and female dies of different widths and shapes. Rollers may be spaced along the length of each rack to ease the movement of dies into the rack and the transfer of dies therefrom.

A wheeled carriage carries the storage rack. A pair of parallel rails are positioned on the floor adjacent to and perpendicular to one end of the length of a press brake bed, and the carriage wheels engage and ride on those rails. A first drive motor moves the carriage and the storage rack which it carries in a horizontal direction along the tracks. The first drive motor is mechanically linked to a drive shaft which carries a pair of wheels for driving the carriage along the parallel rails. The carriage also includes a second drive motor for raising and lowering the storage rack vertically. The second drive motor is mechanically linked to a drive system, such as a screwjack, for raising and lowering the storage rack. A control system is connected to both the first and second drive motors, and serves to control the horizontal movement of the carriage and the vertical movement storage rack which it carries. This allows the storage rack to be accurately located adjacent one end of the length of a press brake bed in order to receive and store a male die and a female die from a press brake bed or for transferring a male die and a female die pair from the storage rack to a press brake bed.

The control system preferably includes a multi-axis control, such as a joystick, which can be used to control both the first drive motor, and thereby the horizontal motion of the carriage along the rails, and also the second drive motor, and thereby the vertical raising and lowering of the storage rack. In preferred embodiments the control panel is mounted on a hinged support arm which is attached to the end of the press brake which is adjacent to the automated die transfer system of the present invention. Such a hinged support arm allows the control panel to be pivoted away from the end of the press brake for access when it is being used to control the position of the carriage and storage rack, and then back to the rear of the press brake and out of the way when it is no longer being so used.

In use, the automated die transfer system is used to change a male and female die set from the press brake bed of a press brake as follows. The control panel is pivoted on its hinged arm to the front of the press brake, its power is turned on, and the joystick is used to activate and control the first drive motor to move the carriage in a manner such that the storage rack mounted on the carriage can be brought into alignment with one end of the press brake bed. Then the joystick is used to activate and control the second drive motor to cause the screwjack to move the storage rack, which is now in alignment with one end of the press brake bed, vertically until it is adjacent to the end of the press brake bed. Then, a male die and a female die are transferred, one at a time, from the press brake bed onto the storage rack. The system may then be moved horizontally, and a male die and a female die transferred one at a time, from the storage rack onto the press brake bed.

In actual practice, the transferring of dies includes the steps of first transferring the male die from the upper press brake bed onto an empty upper die storage rack, using the second drive motor to raise the die rack storage assembly vertically, and then transferring the female die from the lower press brake bed onto the adjacent empty lower die rack. Then, the first drive motor is used to move the carriage horizontally until a die rack having a desired male and female die pair is adjacent to the press brake bed. The female die is then moved from that storage rack onto the lower press brake bed, the second drive motor is used to activate the screwjack to lower the die rack storage assembly vertically, and the male die is transferred from the upper tier storage rack onto the upper press brake bed. At the conclusion of the transfer activity the carriage with the storage assembly can be moved rearwardly away from the work area beside and in front of the press brake, and the hinged support arm rotated to cause the control panel to be pivoted back to the rear of the press brake and out of the way until it is to be used again.

In one modification, the parallel rails may be positioned on the floor adjacent to and perpendicular to one end of the length of two or more press brake beds, so that the same system may service two or more press brakes.

While a screwjack is mentioned as providing vertical movement to the storage rack, hydraulic or pneumatic cylinders, scissors lifts, or other mechanisms may be also used for this purpose.

As used herein a "die pair" or "die set" is a combined male and female die of such size and shape that the male fits within the female in a snug mating relation for carrying out metal bending operations between the dies.

These and other objects of the present invention will become apparent to those skilled in the art from the following detailed description, showing the contemplated novel construction, combination, and elements as herein described, and more particularly defined by the appended claims, it being understood that changes in the precise embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments of the present invention according to the best modes presently devised for the practical application of the principles thereof, and in which.

DESCRIPTION OF THE PREFERRED EMBODIMENTS

Figure 1:
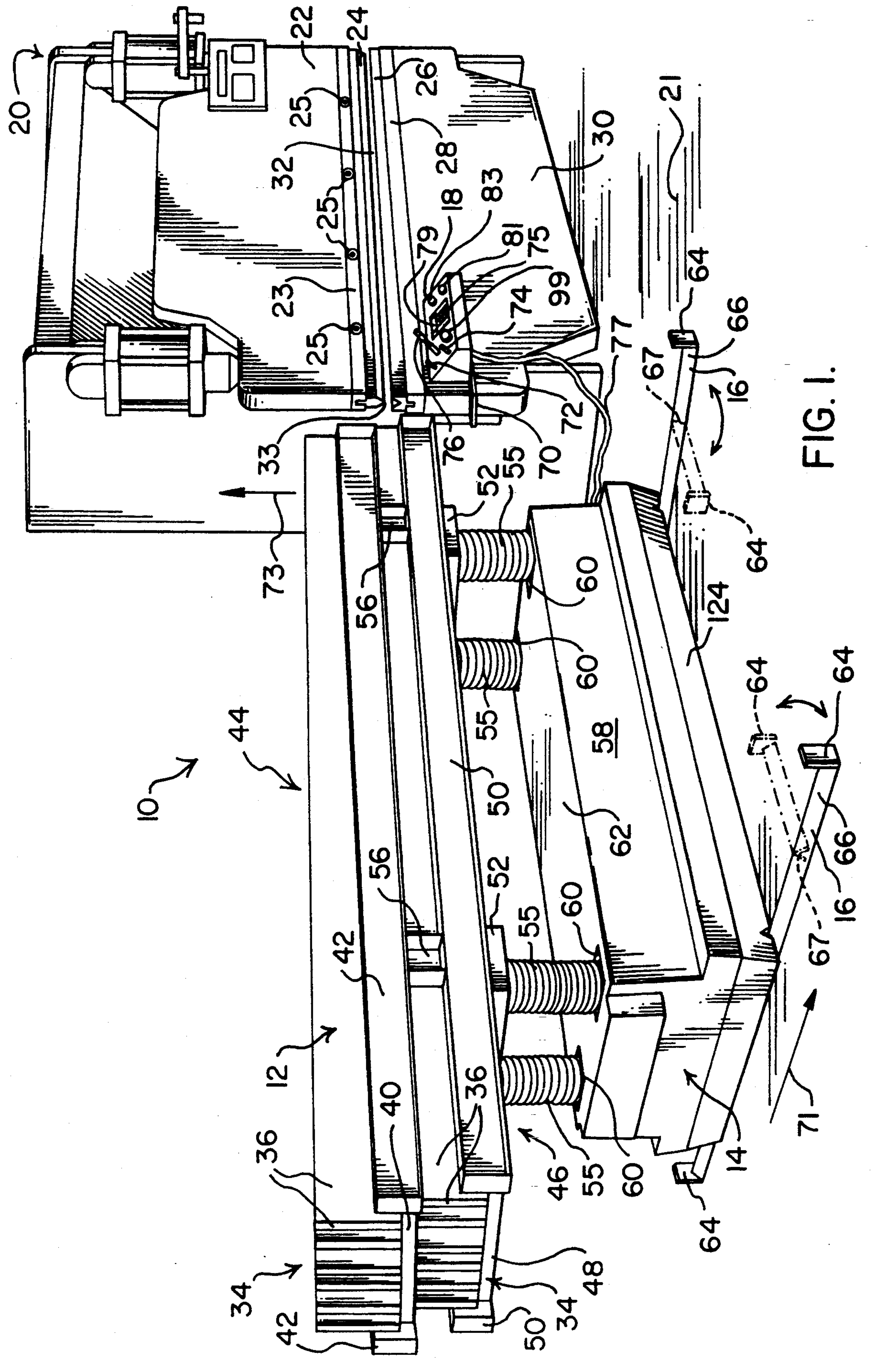
FIG. 1 is a perspective view of the automated die transfer system positioned for a die change out from the left side of a standard press brake, which system includes a die rack storage assembly mounted on top of a carriage which rides on a pair of parallel tracks, and shows a control panel electrically connected to the carriage, which panel is mounted on a hinged bracket attached to the press brake.

In FIG. 1 the subject automated die transfer system is designated by general reference numeral 10. The system 10 broadly includes a die rack storage assembly 12, a travel carriage 14, a pair of inverted "V"-shaped tracks 16, and a control panel 18 for operating system 10. System 10 is used in conjunction with a standard press brake system 20 mounted on a shop floor 21.

Press brake system 20 includes a press brake ram 22 which raises and lowers a male die 24 which is secured to ram 22 using male die clamp plate 23 with tightening bolts 25. The male die 24 is moved downwardly toward the top of a female die 26 with sheet metal placed therebetween for forming a desired bend in a metal part. The female die 26 is received on top of a filler block 28 and either floats free on filler block 28 or is secured thereto using set screws, not shown. Filler block 28 is secured to the top of a base 30. The set of male and female dies 24 and 26 mounted on press brake system 20 make up a press brake bed 32 which can have different sizes and shapes for forming different types of metal parts. The press brake can have various lengths, typically from 10 feet up to 40 feet, or greater. The dies can also have various lengths. Because the dies can be very heavy, a press brake may have the die sets broken up into 10-foot segments for ease in handling. A 10-foot press brake using lighter weight dies will use male and female dies with 10-foot lengths. In the following discussion, system 10 is used with the changing and replacing of male and female dies 24 and 26 at a feed end 33 or the left side of press brake system 20.

Figure 3:
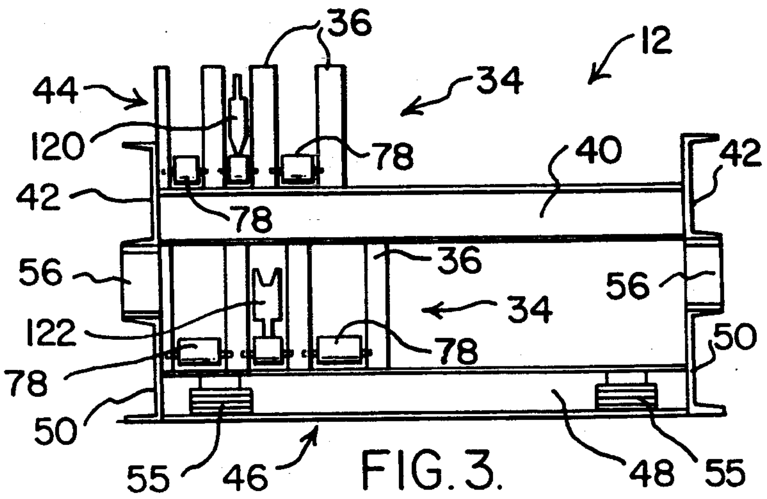
FIG. 3 is an end view of the die rack storage assembly with an upper tier for receiving and storing male dies and a lower tier for receiving and storing female dies.

Die rack storage assembly 12 is modular in design and includes a plurality of die racks 34 having parallel vertical divider plates 36 held apart by a plurality of spacers 38 shown in FIG. 3. Die racks 34 are used for receiving both standard and custom designed male and female dies. As mentioned above the dies may have standard lengths, for example 10 feet, and may come in shorter segmented lengths for heavier tiles where the total die length is 10 feet or greater.

Die racks 34 are mounted on a pair of upper cross beams 40 attached at opposite ends to a pair of upper side beams 42. Cross beams 40 with die racks 34 and side beams 42 make up a top tier 44 for receiving different sizes of male dies similar to male die 24. Storage assembly 12 also includes a bottom tier 46 directly below top tier 44. Bottom tier 46 also includes a plurality of die racks 34 with parallel vertical divider plates 36 with spacers 38 for receiving different sizes of female dies similar to female die 26. Die racks 34 for the female dies are mounted on a pair of lower cross beams 48 attached at opposite ends to a pair of lower side beams 50. The lower side beams 50 are mounted on a pair of screwjack support plates 52. Four screwjacks 54 are attached to opposite ends of support plates 52 for raising and lowering storage assembly 12. The screwjacks 54 can be seen in FIG. 4 and are part of travel carriage 14. Screwjacks 54 are covered with telescoping bellows 55 shown in FIG. 1. Top tier 44 is supported on top of bottom tier 46 by spacers 56 connecting upper side beams 42 and lower side beams 50. While the assembly 12 is shown with both a top tier 44 and a bottom tier 46, it can be appreciated that if desired the top tier 44 can be removed and a single bottom tier 46 used for storing both male and female dies.

Travel carriage 14 includes a carriage housing 58 with openings 60 in a housing top 62 for receiving bellows 55 and screwjacks 54 therethrough. Travel carriage 14 rides on parallel tracks 16 having track stops 64 attached at opposite ends of each track 16. A front portion 66 of tracks 16 is hinged at a hinge point 67 so that front portion 66 can be folded at right angles to each other as shown in phantom in FIG. 1 when system 10 is not in use. This allows the work area in front of press brake system 20 and on the shop floor 21 to be free from any obstructions. At the hinge points 67, as shown in FIG. 1 is an electrical proximity sensor 68. When tracks 16 are folded, as shown in dotted lines, sensor 68 breaks the electrical current to one of the carriages drive motors and horizontal movement of travel carriage 14 is prevented. Not until the front portions 66 are properly unfolded and tracks 16 are in alignment will proximity sensor 68 be again electrically engaged and travel carriage 14 be able to travel forward and rearward on tracks 16.

In FIG. 1 control panel 18 for operating system 10 is shown mounted on a hinged support arm 70 which allows panel 18 to be moved from the back side of press brake bed 32, where it is out of the way, to its operating position in front of the base 30 and adjacent the feed end 33 of press brake system 20. When control panel 18 is in this position the press brake operator can make precise adjustments of the horizontal and vertical axis of the die rack storage assembly for quick and safe change out of male and female dies 24 and 26. The control panel 18 includes a three position selector switch 72 which turns system 10 from an off mode to a choice of a "full-automated" mode or to a "semi-automated" mode. A two position selection switch 74 has a horizontal position and a vertical position so that the two drive motors of travel carriage 14 cannot be activated at the same time when it is used in the semi-automated mode. When selection switch 74 is moved to its horizontal position a joystick 76 on control panel 18 is used to control the movement of travel carriage 14 forward as indicated by arrow 71 until storage assembly 12 is properly positioned along a horizontal axis for receiving, for example, male die 24. The second button 74 is now moved to a vertical position and joystick 76 is used to control the movement of storage assembly 12 upward, as indicated by arrow 73, until storage assembly 12 is properly positioned along a vertical axis. When system 10 is used in the semi-automated mode, as described, the operator will also use joystick 76 to visually align both the horizontal and vertical axis positions of die rack storage assembly 12 during the die insertion and storage sequences. As a safety feature joystick 76 includes a thumb button deadman release. When the thumb button is released it deactivates the drive motors in travel carriage 14 and initiates motor brakes to immediately stop the mechanical drive of carriage 14 in both the horizontal and vertical axis.

When control panel 18 is used in the full-automated mode, an operator finger touch pad 75 is used to command a programmable logic controller, i.e. PLC, to a desired male and female die rack 34 located on storage assembly 12. The PLC is connected to the control panel 18 via electrical lead 77. The die rack position is visually verified on a display screen 79 when the press brake operator uses the touch pad 75 for making a desired selection. In the fully automated mode the change out sequence of the dies is begun by pushing an advance push button 81. When the die change out has been completed, a "home" push button 83 is activated and the PLC is signaled to retract storage assembly 12 and travel carriage 14 to its original starting position to the rear of press brake system 20.

The incorporation of a dual control mode, whether in the full or semi-automated mode, allows for computer positioning during the full-automated mode and operator controlled positioning during the semi-automated mode. If only operator control positioning is desired, the three position selector switch 72 is deleted and control panel 18 is provided with a two position switch for the semi-automated mode and the off mode. The control panel 18 also includes an emergency stop palm button 99 for shutting down system 10 in the event of a position malfunction.

While the electronics of control panel 18 are not shown, it can be appreciated that a state-of-the-art microprocessor with a memory can be incorporated with press brakes having numerical control systems. The microprocessor can also be programmed to remember where each die set is and to automatically locate the more commonly used die to carriers 34. The semi-automatic mode and manual mode of die selection would then be used for selecting dies that are not used as often.

Figure 1A:
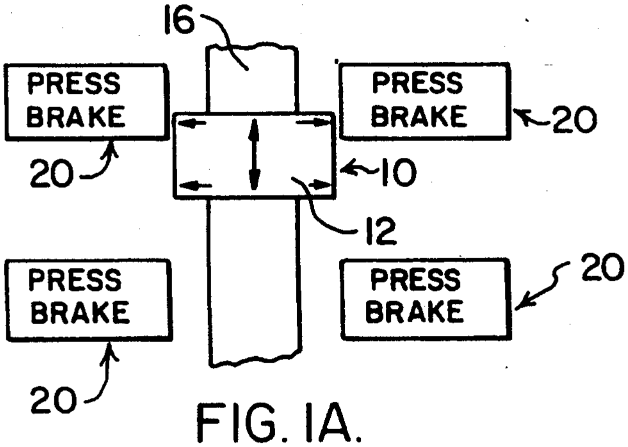
FIG. 1A, is a block diagram showing various configurations of spaced apart, press brakes supported by a single automated die transfer system.

In FIG. 1A transfer system 10 is shown with tracks 16 adjacent the right side of two press brakes 20. In this configuration of press brake locations, system 10 can provide die selection and transfer feeding from the left side of storage assembly 12 to both of press brakes 20. Also in FIG. 1A tracks 16 are disposed between two press brakes 20. In this configuration system 10 can provide die selection and transfer feeding from both the left side and the right side of storage assembly 12 to both of press brakes 20. Further in FIG. 1A a combination of a work cell area is shown with a single system 10 supporting die selection and transfer to four press brakes 20. The tracks 16 are shown running between two pair of press brakes with the feeding of dies from both the left side and the right side of storage assembly 12. It can be appreciated from the above examples, system 10 can be used with any number and combinations of press brakes 20 for ease in die set change outs.

Figure 2:
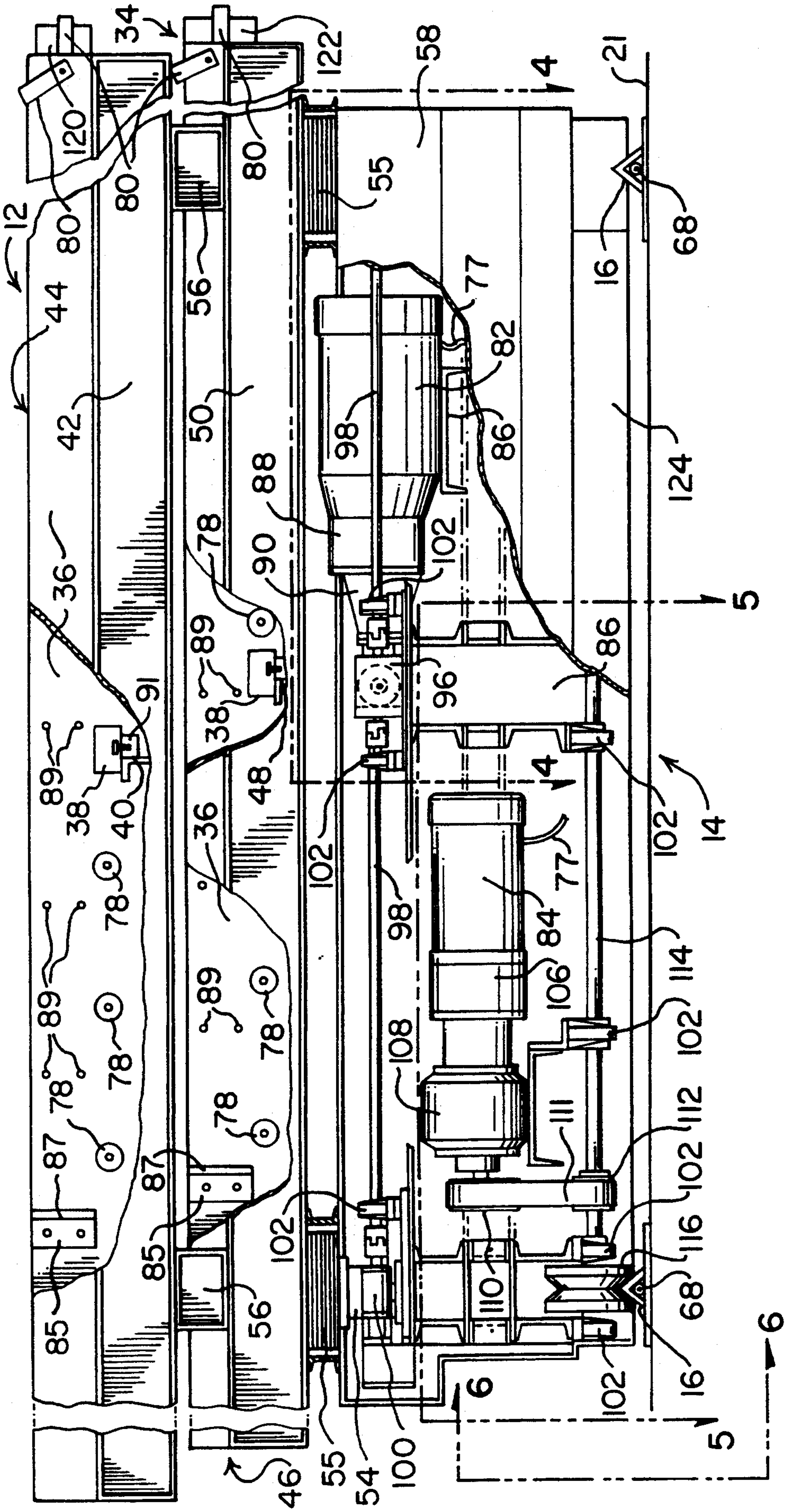
FIG. 2 is a front view of the die rack storage assembly with a portion of one of the male and female die racks cut away to expose rollers used for receiving dies thereon and the travel carriage with a portion of the carriage housing cut away to expose two motors used for moving the carriage on the rails and for raising and lowering the storage assembly.

In FIG. 2 a front view of the die rack storage assembly 12 and travel carriage 14 is shown. A portion of vertical divider plates 36 and the upper and lower side beams 42 and 50 are cut away to expose rollers 78 which are mounted to the sides of parallel divider plates 36 for receiving the male and female dies thereon as they are received and discharged from die carriers 34. The rollers 78 are spaced along the length of divider plates 36 and the spacing and number of rollers 78 will be based on the weight of the die stored thereon. Hinged die locks 80 are mounted on the right sides of the vertical divider plates 36 on the top and bottom tiers 44 and 46. When the dies are fed from the right of storage assembly 12, locks 80 are moved upwardly in an out-of-the-way position. When dies are fed out of both sides of the die racks 34 locks 80 would be used on both sides of the divider plates 36 to prevent dies from rolling on rollers 78 and over extending from either side of storage assembly 12.

Stop blocks 85 are near the left side of top and bottom tier 44 and 46 shown in FIG. 2. Bumper pads 87 are provided to hold shorter length dies a prescribed distance along the length of divider plates 36 with a portion of the die allowed to extend outwardly from the side of divider plates 36. The extended portion of the die provides a hand grip on the die when transferring the die on to press brake system 20. The stop blocks 85 would be removed when feeding dies from both sides of assembly 12. Further, apertures 89 are provided along the length of divider plates 36 for installing stop blocks 85 at various locations depending on the length of the die. The width of the die received in each die rack 34 dictates the length of rollers 78 and spacer 38. The spacers 38 are adjustably attached along the length of "U" shaped channel 91 secured to a portion of the upper and lower cross beams 40 and 48. By loosening and or replacing spacers 38 on channels 91 the die racks 34 can easily be adjusted for receiving different sizes and shapes of dies.

A pair of hinged die retainers 80 are mounted on opposite ends of the vertical spacers 36 on top tier 44. When the male dies are fed from the right of storage assembly 12, the retainer 80 on the right is moved upwardly to an out-of-the-way position, as shown. On the left side, the other retainer 80 not shown in a lowered position to prevent the die when it is received between spacers 36 from rolling on rollers 78 and extending outwardly from the left side of assembly 12. The retainers 80 are shown on lower tier 44, but they can be used equally well at the ends of any selected die carrier 34.

Figure 4:
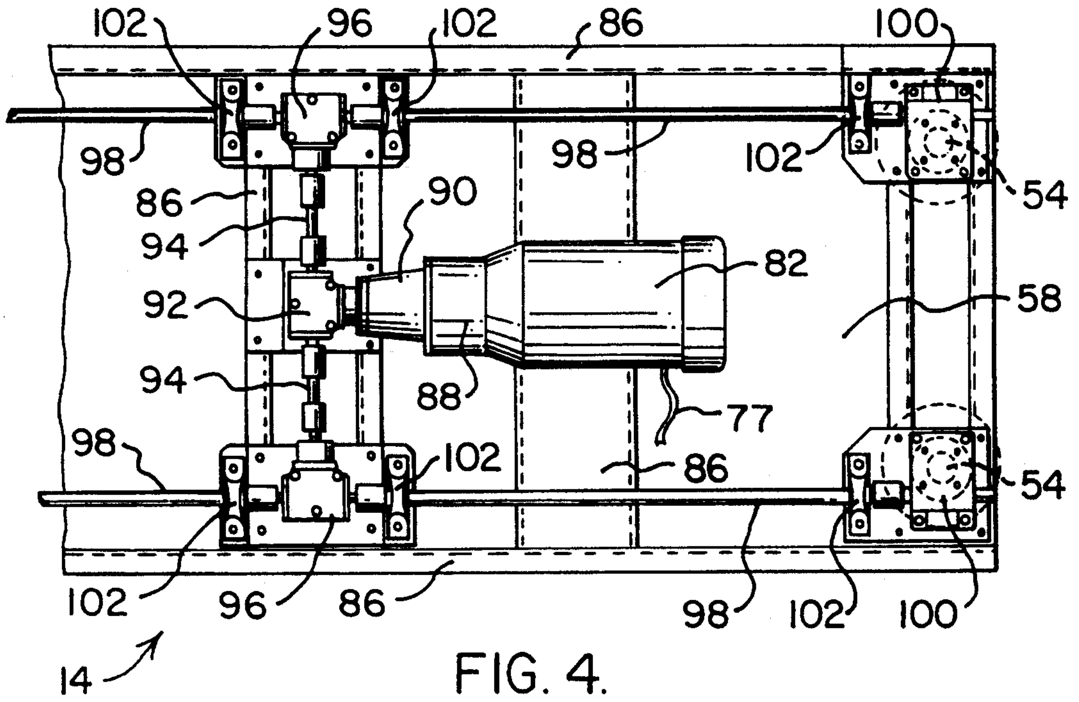
FIG. 4 is a top view of a portion of the travel carriage taken along lines 4—4 shown in FIG. 2 and illustrating the drive motor, gearing and screwjacks for raising and lowering the storage assembly.

Also in FIG. 2 a portion of carriage housing 58 has been broken away to expose vertical (second) drive motor 82 and horizontal (first) drive motor 84. The vertical drive motor 82 is mounted on a portion of a carriage frame 86. Motor 82 includes a brake 88 and overrun clutch 90 which disengages motor 82 when there is a power overload. Motor 82 is connected to a right angle gear transfer box 92 having a pair of outwardly extending drive shafts 94. Referring now to both FIG. 2 and FIG. 4, taken along lines 4—4 shown in FIG. 2, drive shafts 94 are connected to a pair of transfer boxes 96. From opposite sides of the transfer boxes 96 extend four drive shafts 98. Drive shafts 98 are connected to worm gear boxes 100 which engage four screwjacks 54 mounted on the four corners of carriage frame 86 for raising and lowering storage assembly 12. Only two of the worm gear boxes 100 and screwjacks 54 are shown in FIG. 4. The drive shafts 98 are supported on frame 86 by a plurality of pillow block bearings 102. By using the control panel 18 connected to electrical lead 77, the direction of motor 82 can be reversed depending on whether the storage assembly 12 is to be raised or lowered along a vertical axis.

Figure 5:
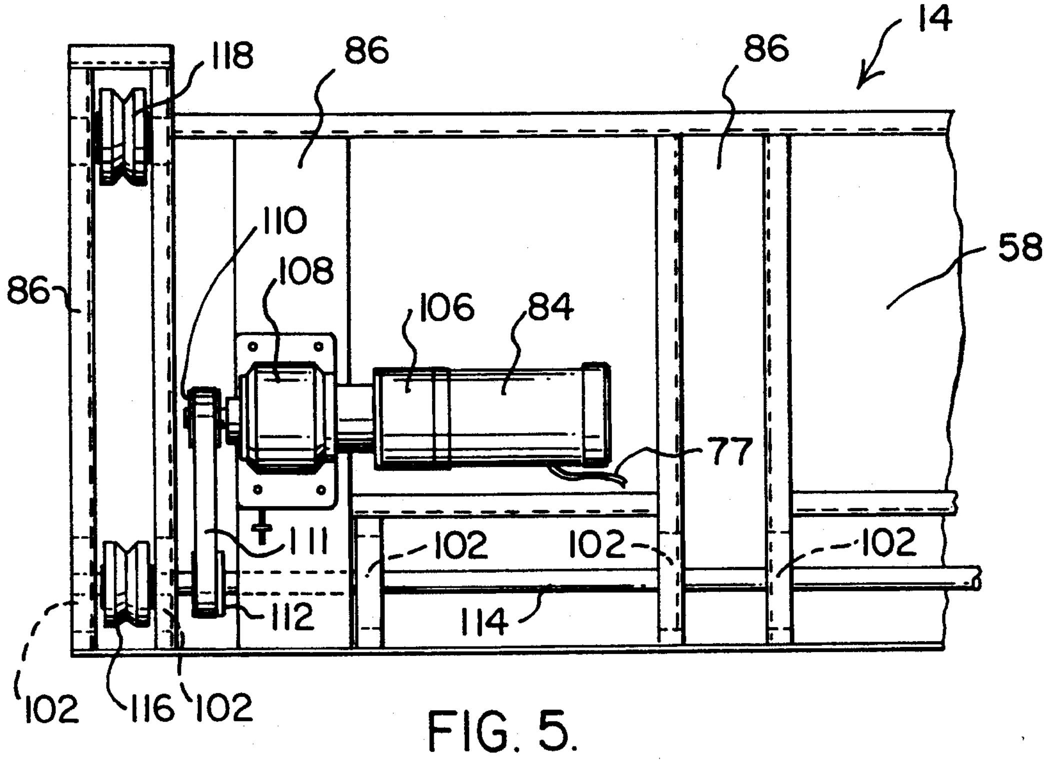
FIG. 5 is a top view of a portion of the travel carriage taken along lines 5—5 shown in FIG. 2 and illustrating the drive motor, drive belt, and drive shaft for moving the travel carriage forward and rearward on the rails.

Horizontal drive motor 84 includes a brake 106 and is attached to a gear reduction box 108 which includes a drive pulley 110 having a timing belt 111 connected to a driven pulley 112 mounted on a drive shaft 114. Drive shaft 114 is supported on pillow block bearings 102 mounted on carriage frame 86. The opposite ends of the drive shaft 114 are attached to "V"-grooved drive wheels 116 which ride on top of inverted "V"-shaped tracks 16. Only the left hand drive wheel 116 can be seen in FIG. 2. Referring now to FIG. 5, taken along lines 5—5 of FIG. 2, a top view of horizontal drive motor 84 can be seen with brake 106, gear reduction box 108, drive pulley 110, timing belt 111, driven pulley 112, and drive shaft 114 connected to one of the drive wheels 116. The drive wheels 116 are used with two idle wheels 118 for transporting die rack storage assembly 12 and travel carriage 14 on parallel tracks 16. Only one end of the idle wheels 118 is shown in FIG. 5. FIG. 3 is an end view of the right side of the die rack storage assembly 12 shown in FIG. 1 with three of the die racks 34 shown on top tier 44 and three on bottom tier 46. The die racks 34 are made up of vertical divider plates 36, rollers 78, and spacers 38, shown in FIG. 2. The distance between spacers 38 will vary depending on the width of male and female dies that are used on press brake system 20. In FIG. 3 additional room has been left on assembly 112 for adding divider plates 36, spacers 38, and rollers 78 as additional storage of dies is required. Also in FIG. 3, there is shown a male die 120 and a female die 122 in storage waiting to be changed with the male and female dies 24 and 26 mounted in the press brake bed 32 of press brake system 20.

Figure 6:
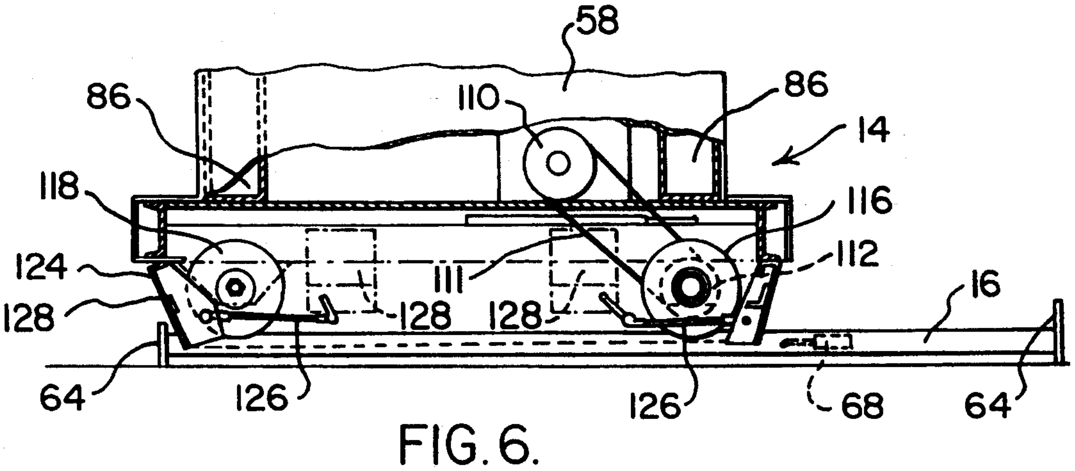
FIG. 6 is a lower side view of a portion of the travel carriage taken along lines 6—6 shown in FIG. 2 and illustrating two of the four "V"-shaped wheels riding on the inverted "V"-shaped rails, which can be recessed into the floor if necessary.

In FIG. 6 a partial end view of carriage 14 taken along lines 6—6 of FIG. 2 is shown. In this view a pair of bumper bars 124 are shown pivotally attached to frame 86 and to linkage 126 which holds bumper bars 124 in a down position in front of drive wheels 116 and idle wheels 118. Bumper bars 124 extend along the length of the front and rear of travel carriage 14 and are an added safety feature should there be any obstruction in the path of carriage 14. When, for example, travel carriage 14 is moved rearwardly on tracks 16 and prior to the control panel 18 stopping the rearward travel, rear bumper bar 124, as shown in FIG. 6, engages track stop 64. This causes bumper bar 124 to pivot toward wheel 118 thereby moving linkage 126 which activates limit switch 128. Limit switch 118 is connected to brake 106, shown in FIG. 5, which in turn stops the rearward travel of carriage 14. The front bumper bar 124 works in a like manner as rear bumper bar 124.

Figure 7:
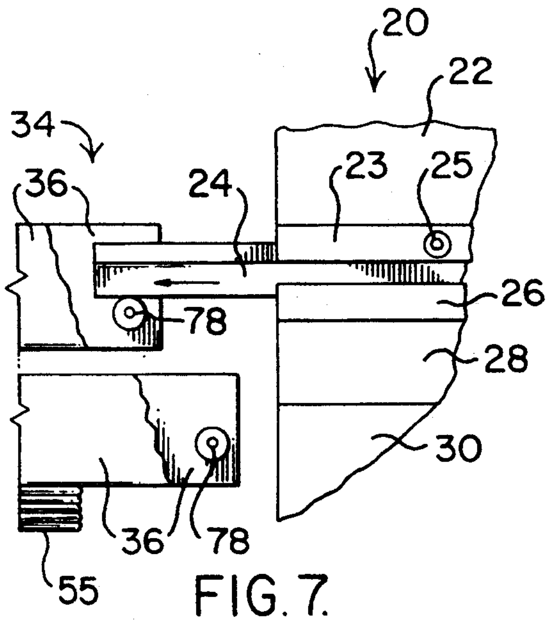
FIGS. 7 and 8 are front views of a portion of the die rack storage assembly and a portion of the press brake illustrating the change out of the male die first and then the female die shown attached to the press brake in FIG. 1.
Figure 8:
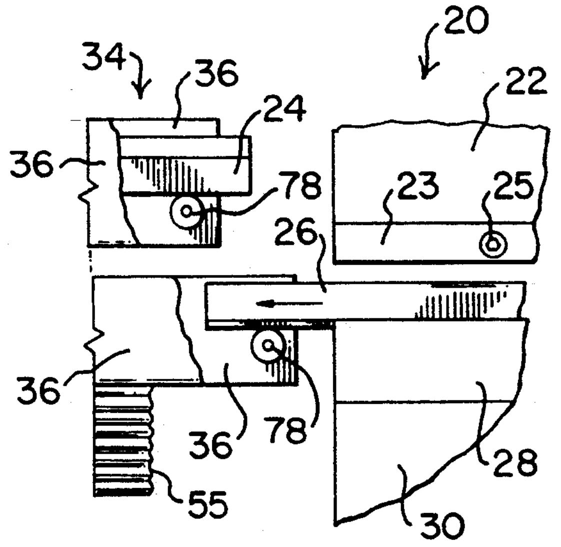
Figure 9:
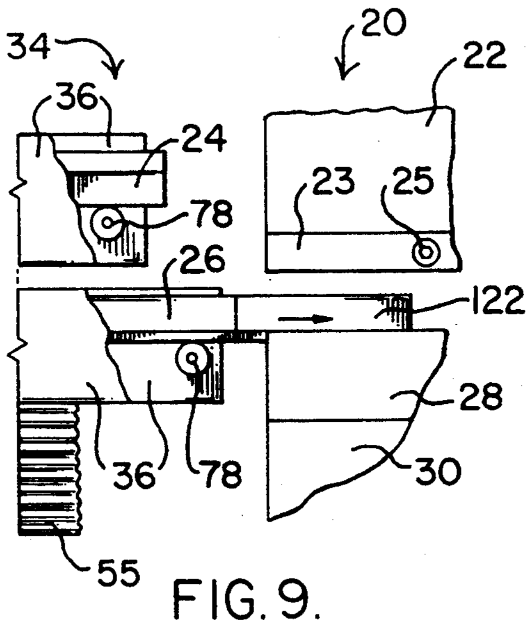
FIGS. 9 and 10 are front views of a portion of the die rack storage assembly and a portion of the press brake illustrating the transfer of the female die first and then the male die shown in the storage assembly in FIG. 3 to the press brake.
Figure 10:
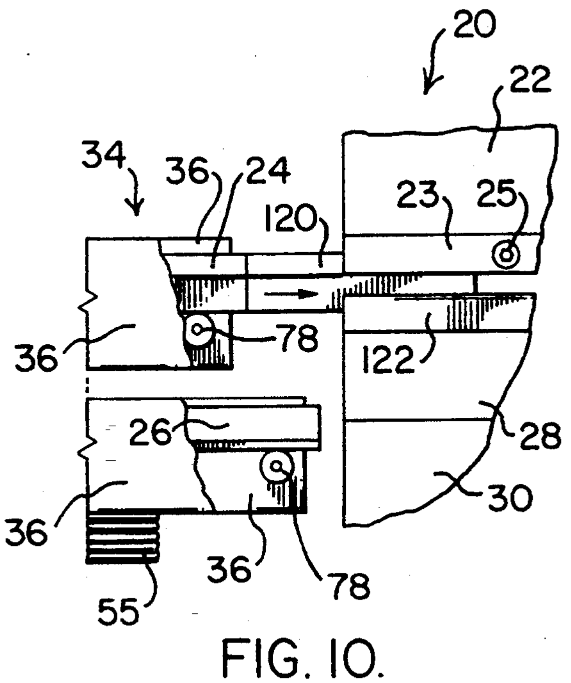

Referring now to FIGS. 7 through 10, the operation of system 10 is now further described using the semi-automated mode. When the operator wishes to change dies, control panel 18 is moved to the front of press brake system 20 as shown in FIG. 1. The hinged front portion 66 of rails 16 is unfolded and the proximity sensor 68 is activated. The selector switch 72 is moved to a semi-automated mode position and selector switch 74 is moved to a horizontal mode position. The joystick 76 is then used to move carriage 14 forward on the rails 16 until, in this example, the front vacant male die rack 34, which is shown in FIG. 3, is positioned along a horizontal axis with press brake bed 32. The operator now moves switch 74 to a vertical mode position and travel carriage 14 moves storage assembly 14 with vacant male die rack 34 upward until the vacant male die rack 34 is adjacent one end of male die 24. The male die 24, which has been loosened from male die clamp plates 23 and is cradled on top of female die 26 is now slid into vacant die rack 34, as shown in FIG. 7, with rollers 78 mounted on divider plates 36 aiding the receipt of male die 24. The forward divider plate 36 has been cut away to show a front roller 78 receiving male die 24. The joystick 76 is now used to raise storage assembly 14 to position a vacant female die rack 34 as shown in FIG. 8 adjacent the end of female die 26 which as been loosened from filler block 28. The female die 26 is now slid into the vacant die rack 34. The selector switch 74 is now moved to a horizontal mode position and joystick 76 is used to move assembly 14 horizontally and adjacent female die 122, shown in FIG. 3, which is waiting in storage. Female die 122 is now slid onto the top of filler block 28 as shown in FIG. 9. The switch 74 is now moved to a vertical mode position and assembly 14 is lowered to a position adjacent male die 120 shown in FIG. 3, which is also waiting in storage. The male die 120 is now slid onto the top of the female die 122 as shown in FIG. 10 and engaged by clamp plate 23. The male die 120 is tightened by clamp plate 23 and the change out of the dies is completed. The switch 74 is moved to a horizontal mode position and travel carriage 14 is moved rearwardly away from the operator's work area. The front portions 66 of rails 16 are again folded and control panel 18 is moved to its out-of-the-way position behind press brake system 20.

It is therefore seen that the present invention provides an automated die transfer system which allows a single operator to change out heavy male and female press brake dies mounted along a length of a press brake bed without the use of additional manpower or equipment, such as a fork lift, a chain hoist, and other heavy lifting equipment and their operators. It also provides a combined upper and lower tier storage rack for receiving and storing a male and female die pair at the same location, or for transferring a male and female die pair to a press brake bed. The racks may have rollers spaced along their length in order to ease the movement of dies into and the transfer of dies therefrom. It further teaches how some of those racks can have different widths for receiving and storing male and female dies of different widths and shapes so that the die rack storage assembly can accommodate both standard and custom dies, and how the dies which are used most frequently may be located within the die rack storage assembly at locations which require the least amount of movement of the system, thereby also reducing transfer and travel time. It further teaches a wheeled carriage which carries the storage rack, and the provision of a pair of floor mounted tracks or parallel rails which are positioned on the floor adjacent to and perpendicular to one end of the length of a press brake bed, upon which rails the carriage wheels can ride. It also teaches such floor mounted tracks which pivot at a hinge point so that a portion of the tracks disposed in front of the press brake can be folded out of the way to eliminate any obstruction of the system in front of the press brake when the transfer system is not in use.

The present invention also teaches how a first drive motor can be provided to move the carriage and the storage rack which it carries in a horizontal direction along the tracks, and a second drive motor for raising and lowering the storage rack vertically, so that the storage rack can be accurately located adjacent one end of the length of a press brake bed in order to receive and store a male die and a female die from a press brake bed or for transferring a male die and a female die pair from the storage rack to a press brake bed. A control system is connected to both the first and second drive motors, and which serves to accurately control the movement of the carriage and the storage rack which it carries, which control system includes a multi-axis control, such as a joystick, which can be used to control both the first drive motor, and thereby the horizontal motion of the carriage along the rails, and also the second drive motor, and thereby the vertical raising and lowering of the storage means. The mounting of the control panel on a hinged support arm which is attached to the end of the press brake which is adjacent to the automated die transfer system of the present invention is disclosed, so that the control panel can be pivoted away from the end of the press brake when it is being used to control the position of the carriage and storage rack, and then back to the rear of the press brake and out of the way when it is no longer being used.

The use of the system to service not only one press brake but a plurality of press brakes by spacing the system adjacent to or between press brakes so that parallel rails of the system allow for the positioning of the storage assembly and travel carriage adjacent one end of each of the press brake beds, is taught.

It is seen that the present invention, through the ease of quickly changing die sets will cause little or no damage to the dies during their wear life, and yet save time and make press brake operations more efficient.

While the invention has been particularly shown, described and illustrated in detail with reference to preferred embodiments and modifications thereof, it should be understood by those skilled in the art that the foregoing and other modifications are exemplary only, and that equivalent changes in form and detail may be made therein without departing from the true spirit and scope of the invention as claimed, except as precluded by the prior art.

The embodiments of the invention for which an exclusive privilege and property right is claimed are defined as follows:

1. A press brake die handling system for storing multiple elongated press brake dies and for positioning same adjacent to a press brake including a press brake bed adapted to receive pairs of said dies, each said die being longitudinally transferable between a stored position on said handling system and a use position in said press brake bed along a transfer path generally parallel to a longitudinal axis of said press brake bed, said die handling system comprising:

(a) die storage means including a plurality of die storage spaces each adapted for selectively receiving a respective die, said die storage spaces being positioned in generally juxtaposed relationship and extending in substantially parallel relationship with respect to said longitudinal axis, said storage means further including a plurality of roller means each associated with a respective die storage space and adapted for supporting a respective die in its stored position and transferring same between its stored and use positions;

(b) carriage means mounting said storage means and including:

(1) drive means for selectively moving said transfer system along a horizontal path of movement extending generally perpendicularly with respect to said press brake die longitudinal axis; and (2) storage elevating means for raising and lowering said storage means along a vertical path of movement with respect to said press brake bed; and (c) control means connected to said drive means and said storage elevating means for selectively controlling said drive means and said storage elevating means to move said storage means in said horizontal and vertical paths, respectively for selectively positioning respective die storage spaces in said storage means in longitudinal alignment with a respective die receiving location in said press brake bed in a die transfer relationship.

2. The system as described in claim 1 further including means for guiding said carriage means along said horizontal path along a floor.

3. The system as described in claim 1 wherein said storage means includes a plurality of rows of said storage spaces.

4. The system as described in claim 3 wherein said plurality of rows includes at least one upper tier row and at least one paired lower tier row.

5. The system as described in claim 4 wherein said plurality of rows included in said storage means include a plurality of upper tier rows and a plurality of lower tier rows, with each said lower tier row being disposed below one of said upper tier rows.

6. The system as described in claim 1 wherein said control means is carried by a control panel.

7. The system as described in claim 6 wherein said control panel is disposed adjacent one end of said press brake, whereby said control panel is located in a position which allows for ease of its use in positioning said carriage means.

8. A press brake die handling system for storing multiple elongated male and female die pairs elongated press brake dies and for positioning same adjacent to a press brake including a press brake bed adapted to receive male and female pairs of said dies, each said die being longitudinally transferable between a stored position on said handling system and a use position in said press brake bed along a transfer path generally parallel to a longitudinal axis of said press brake bed, said die handling system comprising:

(a) die storage means including a plurality of die storage spaces each adapted for selectively receiving a respective die, said die storage spaces being positioned in generally juxtaposed relationship and extending in substantially parallel relationship with respect to said longitudinal axis to form a plurality of rows, said rows being arranged vertically with respect to each other, said storage means further including a plurality of roller means each associated with a respective die storage space and adapted for supporting a respective die in its stored position and transferring same between its stored and use positions;

(b) carriage means mounting said storage means and including:

(1) drive means for selectively moving said transfer system along a horizontal path of movement extending generally perpendicularly with respect to said press brake die longitudinal axis; and (2) storage elevating means for selectively raising and lowering said storage means along a vertical path of movement with respect to said press brake bed; and (c) control means connected to said drive means and said storage elevating means for selectively controlling said drive means and said storage elevating means to move said storage means in said horizontal and vertical paths, respectively for selectively positioning respective die storage spaces in any of said rows in said storage means in longitudinal alignment with a respective die receiving location in said press brake bed in a die transfer relationship.

9. The system as described in claim 8 wherein a pair of parallel rails are positioned on a floor surface, said rails extending substantially parallel to said horizontal path, said carriage means having a plurality of wheels for engaging and riding on said rails.

10. The system as described in claim 8 wherein said storage means includes a number of storage spaces having different widths for receiving and storing male and female dies of different widths and shapes.

11. The system as described in claim 10 wherein said plurality of tiers includes at least one upper tier row and at least one paired lower tier row disposed below said at least one upper tier row.

12. The system as described in claim 8 wherein said roller means are spaced along the length of each storage space.

13. The system as described in claim 9 wherein said drive means is a motor which is mechanically linked to a drive shaft, said drive shaft having a pair of drive wheels mounted on opposite ends thereof for driving said carriage means along said parallel rails.

14. The system as described in claim 8 wherein said storage elevating means includes a motor.

15. The system as described in claim 14 wherein said storage elevating means includes a screwjack.

16. The system as described in claim 8 wherein a pair of elongated parallel rails are positioned on a floor surface, said rails extending substantially parallel to said horizontal path, said rails being adjacent to one end of a plurality of press brakes, said carriage means having a plurality of wheels for engaging and riding on said rails, so that said system may service said plurality of press brakes.

17. An automated die transfer system for changing a male and female die pair mounted along a length of a press brake bed used in a press brake, the system comprising:

upper and lower tierred storage means for storing a male and female die pair or for transferring a male and female die pair therefrom;

carriage means for carrying said upper and lower tierred storage means, said carriage means including first drive means for moving said carriage means and said upper and lower tierred storage means in a horizontal direction along a floor perpendicular to one end of the length of a press brake bed, said carriage means also having a second drive means for raising and lowering said storage means vertically;

a control panel including multiaxis motion control means in the form of a joystick connected to said first drive means and said second drive means to thereby control said first drive means, and thereby control the motion of said carriage means in a horizontal direction along a floor perpendicular to one end of the length of a press brake bed, and said second drive means, and to thereby also control the vertical raising and lowering of said storage means, whereby said storage means may be accurately located adjacent one end of the length of a press brake bed in order to receive and store a male die and a female die from a press brake bed or for transferring a male die and a female die from said storage means to a press brake bed.

18. A press brake die handling system for storing multiple elongated male and female press brake die pairs and for positioning same adjacent to a press brake including a press brake bed adapted to receive male and female pairs of said dies, each said die being longitudinally transferable between a stored position on said handling system and a use position in said press brake bed along a transfer path generally parallel to a longitudinal axis of said press brake bed, said die handling system comprising:

(a) die storage means including a plurality of die storage spaces each adapted for selectively receiving a respective die, said die storage spaces being positioned in generally juxtaposed relationship and extending in substantially parallel relationship with respect to said longitudinal axis to form a plurality of rows, said rows being arranged vertically with respect to each other, said storage means further including a plurality of roller means each associated with a respective die storage space and adapted for supporting a respective die in its stored position and transferring same between its stored and use positions;

(b) carriage means mounting said storage means and including:

(1) drive means for selectively moving said transfer system along a horizontal path of movement extending generally perpendicularly with respect to said press brake die longitudinal axis; and (2) storage elevating means for raising and lowering said storage means with respect to said press brake bed;

(c) control means connected to said drive means and said storage elevating means for selectively positioning respective die storage spaces in any of said rows in said storage means in longitudinal alignment with a respective die receiving location in said press brake bed in a die transfer relationship;

(d) said control means including a multiaxis motion control joystick for controlling both said drive means, and thereby controlling the motion of said carriage means along said horizontal path, and said storage elevating means, and thereby controlling the vertical raising and lowering of said storage means.

19. A press brake die handling system for storing multiple elongated male and female press brake die pairs and for positioning same adjacent to a press brake including a press brake bed adapted to receive male and female pairs of said dies, each said die being longitudinally transferable between a stored position on said handling system and a use position in said press brake bed along a transfer path generally parallel to a longitudinal axis of said press brake bed, said die handling system comprising:

(a) die storage means including a plurality of die storage spaces each adapted for selectively receiving a respective die, said die storage spaces being positioned in generally juxtaposed relationship and extending in substantially parallel relationship with respect to said longitudinal axis to form a plurality of rows, said rows being arranged vertically with respect to each other, said storage means further including a plurality of roller means each associated with a respective die storage space and adapted for supporting a respective die in its stored position and transferring same between its stored and use positions;

(b) carriage means mounting said storage means and including:

(1) drive means for selectively moving said transfer system along a horizontal path of movement extending generally perpendicularly with respect to said press brake die longitudinal axis; and (2) storage elevating means for raising and lowering said storage means with respect to said press brake bed; and (c) control means connected to said drive means and said storage elevating means for selectively positioning respective die storage spaces in any of said rows in said storage means in longitudinal alignment with a respective die receiving location in said press brake bed in a die transfer relationship, said control including a control panel being mounted on a hinged support arm attached at one end of said press brake for pivoting said control panel from in front of said press brake to the rear of the press brake.

20. A press brake die handling system for storing multiple elongated male and female press brake die pairs and for positioning same adjacent to a press brake including a press brake bed adapted to receive male and female pairs of said dies, each said die being longitudinally transferable between a stored position on said handling system and a use position in said press brake bed along a transfer path generally parallel to a longitudinal axis of said press brake bed, said die handling system comprising:

(a) die storage means including a plurality of die storage spaces each adapted for selectively receiving a respective die, said die storage spaces being positioned in generally juxtaposed relationship and extending in substantially parallel relationship with respect to said longitudinal axis to form a plurality of rows, said rows being arranged vertically with respect to each other, said storage means further including a plurality of roller means each associated with a respective die storage space and adapted for supporting a respective die in its stored position and transferring same between its stored and use positions;

(b) carriage means mounting said storage means and including:

(1) drive means for selectively moving said transfer system along a horizontal path of movement extending generally perpendicularly with respect to said press brake die longitudinal axis; and (2) storage elevating means for raising and lowering said storage means with respect to said press brake bed; and (c) control means connected to said drive means and said storage elevating means for selectively positioning respective die storage spaces in any of said rows in said storage means in longitudinal alignment with a respective die receiving location in said press brake bed in a die transfer relationship, said control means including multiaxis motion control means for controlling both said drive means, and thereby controlling the motion of said carriage means along said horizontal path, and said storage elevating means, and thereby controlling the vertical raising and lowering of said storage means.

21. A method of changing a male and female press brake die set from the press brake bed of a press brake using an automated die transfer system, the system having a rail mounted carriage means with a die storage rack assembly thereon, said die storage rack assembly including an upper tier for male dies and a lower tier for female dies, and a control panel electrically operating a first drive means for causing movement of said carriage means in a horizontal direction along a floor perpendicular to one end of the length of said press brake bed, and a second drive means for providing vertical raising and lowering of said die storage rack assembly, said first and second drive means being mounted on said carriage means, including the steps of:

(a) using said control panel to activate said first drive means and move said carriage means in a manner such that said die storage rack assembly is positioned in alignment with one end of said press brake bed;

(b) using said control panel to activate said second drive means to move said aligned die storage rack assembly vertically, until it is adjacent to said one end of said press brake bed;

(c) transferring, one at a time, a male die and a female die from said press brake bed onto said die storage rack assembly and then placing, one at a time, a male and a female die from said die rack storage assembly onto said press brake bed by first transferring the male die from said press brake bed onto an empty upper tier die rack on said assembly, using said second drive means to raise said die storage rack assembly vertically, transferring the female die from said press brake bed onto an empty lower tier die rack on said assembly, then using said first drive means to move said carriage horizontally until a die rack having a desired male and female die pair is adjacent said press brake bed, placing the female die from that lower tier storage rack onto said press brake bed, and then using said second drive means to lower said die storage rack assembly vertically for transferring the male die on said upper tier storage rack onto said press brake bed.

* * * * *